United States Patent
Posner et al.

(10) Patent No.: US 7,395,075 B2
(45) Date of Patent: Jul. 1, 2008

(54) SYSTEM AND METHOD FOR COLLECTING CONTINUOUS LOCATION UPDATES WHILE MINIMIZING OVERALL NETWORK UTILIZATION

(75) Inventors: Jeffrey Scott Posner, Bethesda, MD (US); Robert C. Ewald, Washington, DC (US)

(73) Assignee: Nextel Communications Inc., Reston, VA (US)

( * ) Notice: Subject to any disclaimer, the term of this patent is extended or adjusted under 35 U.S.C. 154(b) by 329 days.

(21) Appl. No.: 11/223,842

(22) Filed: Sep. 9, 2005

(65) Prior Publication Data
US 2006/0079244 A1    Apr. 13, 2006

Related U.S. Application Data

(60) Provisional application No. 60/608,138, filed on Sep. 9, 2004.

(51) Int. Cl.
*H04Q 7/00* (2006.01)

(52) U.S. Cl. ............. 455/456.1; 455/456.3; 455/456.5; 455/550.1; 455/558; 455/405; 701/207; 340/429.19; 342/357.08

(58) Field of Classification Search ...... 455/456.1–457, 455/404.02, 435.1, 405–409, 404.2, 427, 455/12.1, 90.1–90.3, 433, 414.1, 556.2, 558; 45/418–420; 701/213, 207, 201; 342/357.1–358; 340/426.2, 426.19, 988–994, 539.13, 426.22, 340/825.36, 825.49, 359.13; 709/203, 232, 709/216, 242
See application file for complete search history.

(56) References Cited

U.S. PATENT DOCUMENTS

| | | | |
|---|---|---|---|
| 6,546,335 B1 * | 4/2003 | Tompkins et al. ........... | 701/209 |
| 6,658,095 B1 | 12/2003 | Yoakum et al. | |
| 6,721,652 B1 * | 4/2004 | Sanqunetti ................... | 701/207 |
| 6,757,722 B2 | 6/2004 | Lönnfors et al. | |
| 6,771,991 B1 | 8/2004 | Gupta et al. | |
| 6,807,423 B1 | 10/2004 | Armstrong et al. | |
| 6,825,767 B2 * | 11/2004 | Humbard ................... | 340/573.1 |
| 6,982,656 B1 * | 1/2006 | Coppinger et al. .......... | 340/988 |
| 7,251,472 B2 * | 7/2007 | Choi et al. ................... | 455/411 |
| 2002/0004399 A1 * | 1/2002 | McDonnell et al. ......... | 455/456 |
| 2003/0027549 A1 * | 2/2003 | Kiel et al. .................... | 455/405 |
| 2003/0036379 A1 * | 2/2003 | Nikolai et al. ............... | 455/414 |
| 2003/0060212 A1 * | 3/2003 | Thomas ....................... | 455/456 |
| 2004/0004948 A1 * | 1/2004 | Fletcher et al. ............. | 370/338 |
| 2004/0106414 A1 * | 6/2004 | Ewert et al. ................ | 455/456.1 |
| 2004/0132456 A1 * | 7/2004 | Takeda et al. ............... | 455/450 |
| 2004/0139204 A1 * | 7/2004 | Ergezinger et al. .......... | 709/229 |
| 2004/0155816 A1 * | 8/2004 | Soliman .................. | 342/357.09 |
| 2004/0172481 A1 * | 9/2004 | Engstrom .................... | 709/239 |
| 2004/0176032 A1 * | 9/2004 | Kotola et al. ................ | 455/41.2 |
| 2004/0203603 A1 * | 10/2004 | Pierce et al. ................ | 455/411 |
| 2004/0203691 A1 * | 10/2004 | Mazzara et al. ............. | 455/419 |

(Continued)

*Primary Examiner*—William Trost
*Assistant Examiner*—Kamran Afshar

(57) ABSTRACT

A wireless device and method for providing location updates to a wireless network includes determining a current location of the wireless device, comparing the current location to a second location and transmitting a location update, including presence information, to the wireless network when the current location differs from the second location by at least a predetermined geographical distance. The predetermined geographical distance is determined in accordance with at least one of subscription information associated with the subscriber unit, including a subscription fee paid, an enabled service and a network state. The current location may be determined via GPS, wireless network based position determination or other method.

20 Claims, 4 Drawing Sheets

U.S. PATENT DOCUMENTS

| | | | |
|---|---|---|---|
| 2004/0203692 A1* | 10/2004 | Schwinke et al. | 455/419 |
| 2004/0203873 A1* | 10/2004 | H. Gray | 455/456.1 |
| 2004/0230467 A9* | 11/2004 | Gailey et al. | 705/10 |
| 2004/0266453 A1* | 12/2004 | Maanoja et al. | 455/456.1 |
| 2005/0059410 A1 | 3/2005 | Trossen et al. | |
| 2005/0136946 A1 | 6/2005 | Trossen et al. | |
| 2005/0213525 A1* | 9/2005 | Grayson et al. | 370/312 |
| 2005/0216583 A1* | 9/2005 | Cole et al. | 709/224 |
| 2005/0227705 A1* | 10/2005 | Rousu et al. | 455/456.1 |
| 2005/0255853 A1* | 11/2005 | Ewert et al. | 455/456.1 |
| 2006/0007863 A1* | 1/2006 | Naghian | 370/238 |
| 2006/0280149 A1* | 12/2006 | Kuhl et al. | 370/338 |
| 2008/0070593 A1* | 3/2008 | Altman et al. | 455/457 |

\* cited by examiner

SYSTEM AND METHOD FOR COLLECTING CONTINUOUS LOCATION UPDATES WHILE MINIMIZING OVERALL NETWORK UTILIZATION

CROSS-REFERENCE TO RELATED APPLICATION

The present invention claims the benefit of U.S. Provisional Patent Application No. 60/608,138, filed Sep. 9, 2004, the disclosure of which is incorporated herein by reference.

FIELD OF THE INVENTION

The present invention relates generally to wireless communications systems and more particularly to systems and methods for providing location-based and presence-based services to wireless subscribers.

BACKGROUND OF THE INVENTION

Wireless communications networks conventionally track the location of mobile subscribers. These continuous location updates allow a wireless communication network to forward communications to the mobile subscriber regardless of its location within the wireless coverage area.

Wireless carriers have recently implemented location-based and presence-based services for their mobile subscribers. Location-based services may include driving directions, local news and other services based on the geographic position of the mobile subscriber. Presence-based services allow mobile subscribers to share presence information whenever the subscribers are connected to the network. A common presence service is instant messaging, which provides other user's with information on whether another user is connected to the network and available for instant messaging communications.

The implementation of presence information in wireless networks requires different considerations from the implementation of presence information within computer networks. If every mobile device transmits to the wireless carrier a continuous stream of autonomous location updates, then hundreds of millions of events would traverse the wireless network and would require processing by the wireless network's presence infrastructure. This would both overwhelm the wireless network and potentially limit the economic viability of some location based services due to network and infrastructure limitations and operating costs.

In view of the above, there is a need for an improved system and method for providing location-based and presence-based services to a wireless device.

SUMMARY OF THE INVENTION

The present invention is a system and method for providing location updates to a wireless network. In one embodiment, a method for providing location updates to a wireless network includes determining a current location of the wireless device, comparing the current location to a second location and transmitting a location update, including presence information, to the wireless network when the current location differs from the second location by at least a predetermined geographical distance. The predetermined geographical distance is determined in accordance with at least one of subscription information associated with the subscriber unit, including a subscription fee paid, an enabled service and a network state. The current location may be determined via GPS, wireless network based position determination or other method.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
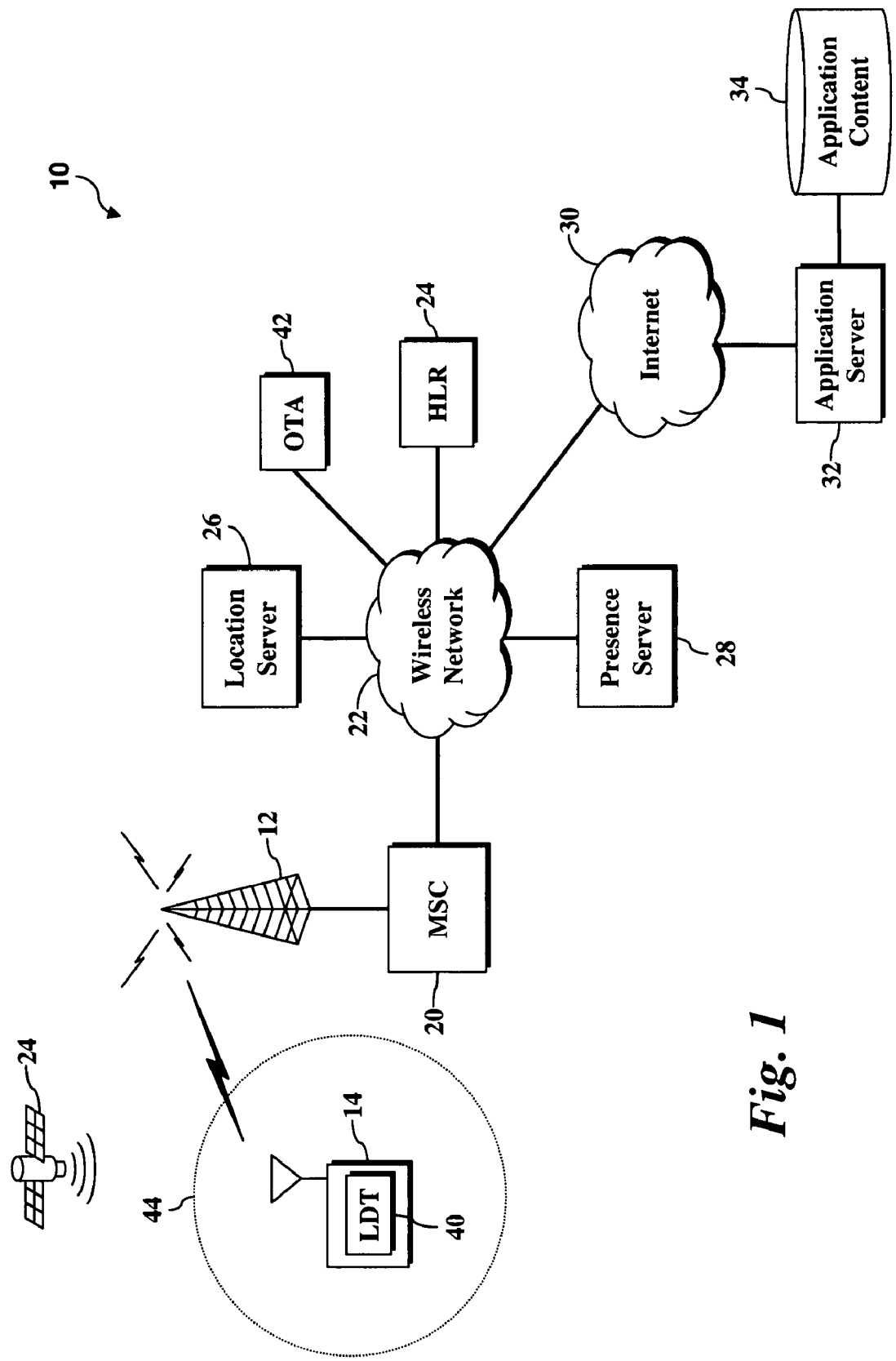
FIG. 1 is an embodiment of the present invention.

An exemplary embodiment of the present invention will be described with reference to FIG. 1. A wireless communications system 10 includes a base station 12 providing wireless communications services to at least one subscriber unit 14. The subscriber unit 14 communicates with the base station 12 by exchanging data according to a predetermined digital communications protocol, such as time division multiple access (TDMA). In the exemplary embodiment, the wireless communications system 10 is an integrated Digital Enhanced Network (iDEN), but it will be appreciated that in alternate embodiments the wireless communications system 10 may support other multiple-access wireless communications systems and protocols, such as code division multiple access (CDMA), wideband CMDA (WCDMA), Advanced Mobile Phone Service (AMPS), Global System for Mobile Communications (GSM), General Packet Radio Services (GPRS), High Data Rate (HDR) technology, Push-to-Talk over Cellular (PoC) or voice and data services provided over a broadband network such as WiFi, WiMax, an 802 protocol or similar system.

The wireless communications system 10 facilitates at least one mode of communication such as interconnect, dispatch, email, short messaging service (SMS), multimedia messaging service (MMS) and packet data communications. The subscriber unit 14 may be any device that is adapted for communication with the base station 12 such as a mobile phone, pager, personal digital assistant (PDA), a Personal Computer Memory Card International Association (PCMCIA) card, or portable computer.

A mobile switching center (MSC) 20 manages the wireless communications of the base station 12, including call set-up, routing communications between the subscriber unit 14 and other subscriber units, and routing communications between the subscriber unit 14 and other entities and networks connected to the wireless network 22. It will be appreciated that the wireless communications system 10 of the exemplary embodiment may include additional network components, including a plurality of base stations, base station controllers, and MSCs.

The wireless network 22 also includes a home location register 24, a location server 26 and a presence server 28. The home location register 24 stores subscriber data including information on services and features available to the subscriber. The location server 26, maintains location data for the subscriber unit 14 to facilitate location-based services. The presence server 28 maintains presence information for the subscriber unit 14 to facilitate presence-based services. The wireless network 22 also provides communications with an external network, such as the Internet 30, which may connect an application server 32 which serves application content 34 to the subscriber unit 14.

The subscriber unit 14 is adapted to determine its own position. The position of the subscriber unit 14 may be determined through a variety of methods, including using the Global Positioning System (GPS) operated by the United States Department of Defense, or by calculating the distances between the subscriber unit 14 and two or more base stations using the time difference of signals sent between the subscriber unit 14 and the base stations. In the exemplary embodiment, the subscriber unit 14 is equipped with a GPS receiver adapted to extract information contained in signals broadcast from the GPS satellites 24 to compute the subscriber unit 14's geographic position in terms of its longitude, latitude and altitude. In one embodiment, the GPS receiver searches for and collects the signals broadcast from one or more GPS satellites that are in view. Next, using the time interval between the broadcast time and reception time of each broadcast signal, the GPS receiver calculates the distance between the GPS receiver and each of the identified GPS satellites. These distance measurements, along with the position and time information received in the broadcast signals, enable the GPS receiver to calculate its geographic position.

In one embodiment, the subscriber unit 14 also receives position information through the local base station 12 to assist the subscriber unit 14 in locating its position. The received position information enables a GPS warm start by informing the subscriber unit 14 of the approximate location of the GPS satellites to reduce time needed to acquire the GPS broadcast signals.

The subscriber unit 14 includes a location delta threshold (LDT) function 40, which manages the transmission of location data and presence information by the subscriber unit 14 to the wireless network. The LDT function operates in accordance with LDT data, which defines a minimum change in subscriber unit position that should be met before location and presence information is transmitted to the wireless network's presence infrastructure. The LDT may be configured dynamically, over the air, via an over the air provisioning function 42.

The LDT defines a geo-fence 44 within which the subscriber unit 14 may move without transmitting a location update to the location server 26. When the subscriber unit 14 crosses an outer boundary of the geo-fence 44, a new location update may be transmitted from the subscriber unit 14 to the wireless network. A smaller LDT will allow for more precise tracking of the subscriber unit 14, but will also result in more location updates and greater use of network resources. In the exemplary embodiment, the LDT is established by the wireless carrier in accordance with the subscriber's service needs and willingness to pay for a higher quality of service. For example, a subscriber may pay an additional fee for more responsive location-based services.

Through the use of the configurable LDT, the system of the exemplary embodiment reduces the total number of autonomous location updates, even for mobile workers. For example, a mobile worker such as delivery driver may make periodic stops for extended periods of time. The LDT may be set to 50 feet or more, so that no location updates or location-based presence information are generated while the worker remains at a delivery location. In another example, construction workers may spend an entire workday at one site, and an LDT may be set for each subscriber unit so that location updates are not generated while the construction workers are one site, but are generated whenever a construction worker leaves the general vicinity of the construction site.

Figure 2B:
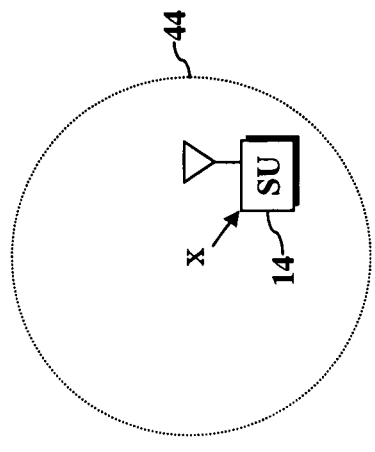
FIGS. 2a-d illustrate an embodiment of a geo-fence.
Figure 2D:
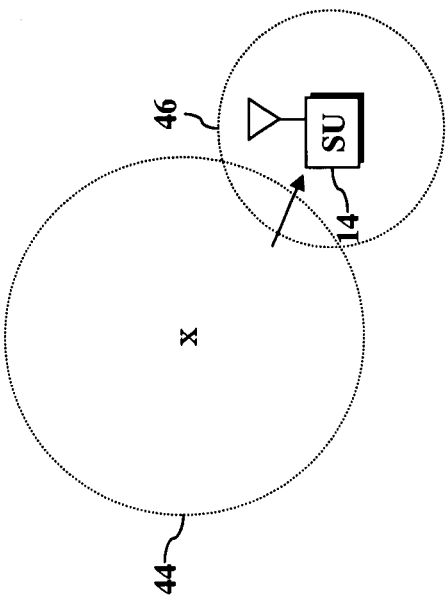
Figure 2A:
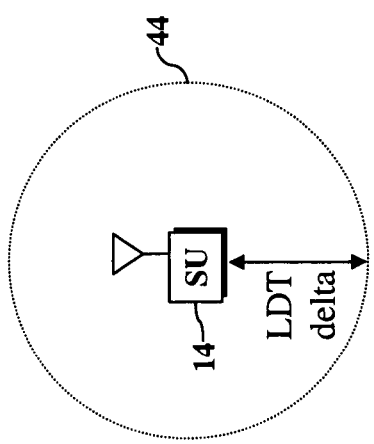
Figure 2C:
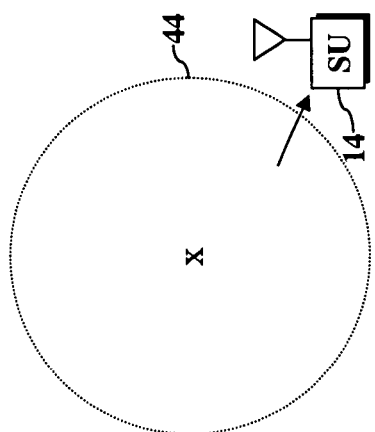

The use of the LDT is illustrated in further detail in FIGS. 2a-d. The geo-fence 44 may be defined based on the subscriber unit 14's current position and a LDT delta value (FIG. 2a). In alternate embodiments, the position of the geo-fence position may be based on other criteria, such as the location of a work site. The subscriber unit 14 may move within the radius of the geo-fence (FIG. 2b) without generating new location updates. If the subscriber unit 14 crosses the geo-fence boundary (FIG. 2c) then the subscriber unit 14 transmits its current location and presence information to the location server. In FIG. 2d, a new geo-fence 46 is established based on the current location.

In one embodiment, the same LDT value is used for each geo-fence established for the subscriber. In the exemplary embodiment, the new geo-fence 46 has a smaller radius (LDT) than the geo-fence 44. For example, the subscriber's new position may be at a shopping mall in which the subscriber's location should be determined more precisely in order to provide location-based services associated with individual shops. While geo-fence boundaries are illustrated having the shape of a circle, it will be appreciated that the geo-fence may define other boundary shapes. It will also be appreciated that the geo-fence may define an area that is external to the subscriber unit 14, and that the location updates will be sent when the subscriber unit crosses inside the geo-fence.

Figure 3:
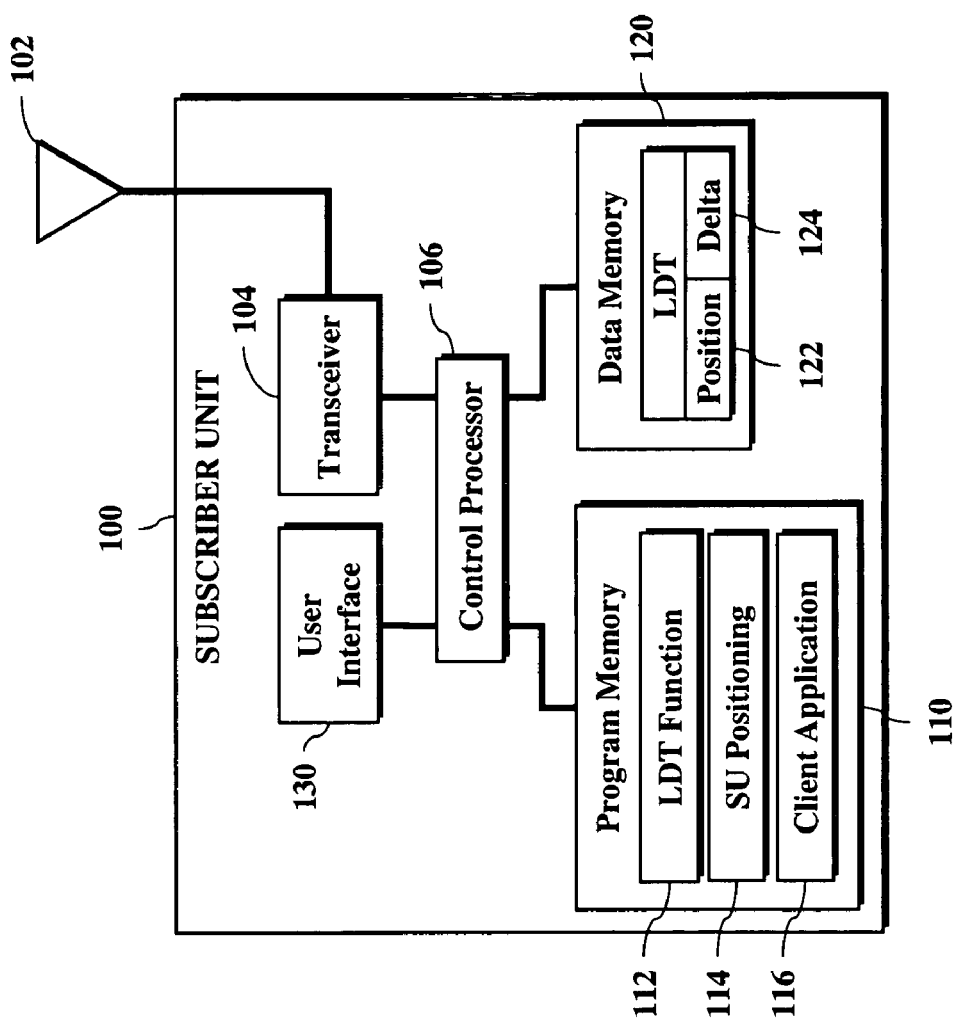
FIG. 3 is an embodiment of a subscriber unit.

A preferred embodiment of a subscriber unit 100 will now be described with reference to the block diagram of FIG. 3. The subscriber unit 100 includes at least one antenna 102 adapted to transmit and receive radio frequency (RF) signals. RF signals received by the antenna 102 are routed by a communications transceiver 104 to a control processor 106 which controls the operation of the subscriber unit 100. The control processor 106 may include a digital signal processor which controls the signal processing of the received GPS satellite signals and wireless communications signals. The control processor 106 is coupled to a program memory 110 and a random access data memory 120. The program memory 110 stores instructions for controlling the control processor 106. The control processor and program memory 110 may be implemented as a single processor, a plurality of processors or a combination of processors and dedicated circuitry including application specific integrated circuits (ASICs).

In one embodiment, the subscriber unit 100 is an iDEN mobile telephone, with a user interface 130 including circuitry and components for providing a user of the subscriber unit 100 with a numeric keypad for user input of telephone numbers and other information and a display. The iDEN mobile telephone is also adapted to process, transmit and receive voice and data communications through the communications transceiver 104. Through the user interface 130, the subscriber may enable presence-based services, such as instant messaging.

The program memory 110 includes the LDT function 112, a subscriber unit positioning function 114 for determining the subscriber unit's geographic position and at least one client application 116 facilitating a presence-based or location-based service. The data memory 120 stores application data including LDT information, which includes a position 122 and a delta 124. The position 122 establishes the center of the geo-fence and the delta 124 defines the radius of the geo-fence boundary. The position 122 may be the position of the subscriber unit at the time of the last location update, or may be defined in accordance with an application. For example, if a construction worker is at a job site, the position 122 may be defined as the center of the job site and the delta 124 may be defined to encompass the entire job site, allowing the detection of the subscriber unit 100 when it crosses outside of the geo-fence.

Figure 4:
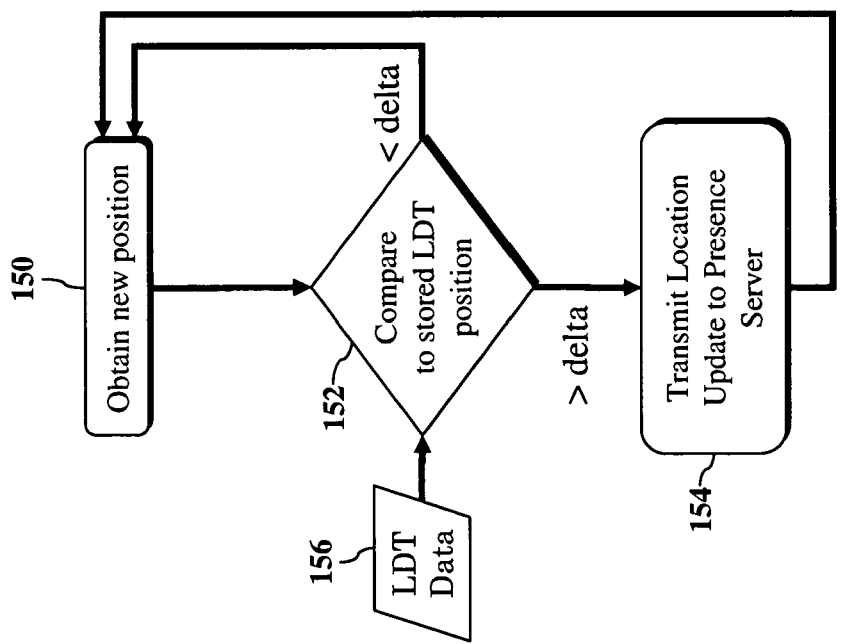
FIG. 4 is a flow diagram illustrating an embodiment of an LDT function.

Referring to FIG. 4, an embodiment of the operation of the LDT function 112 will be described. In step 150, the subscriber unit determines its current position. The position may be determined via GPS satellites, network based position determination services, or other method available to the subscriber unit. In step 152, the subscriber unit compares its new position with the stored LDT position and determines whether the new position crosses the geo-fence. This may be determined by calculating the distance between the coordinates (e.g., longitude, latitude) of the stored LDT position and the coordinates of the new position. If the distance exceeds the LDT, then in step 154 the new location is transmitted to the location server. The LDT data 156 may be periodically updated by the wireless network.

Figure 5:
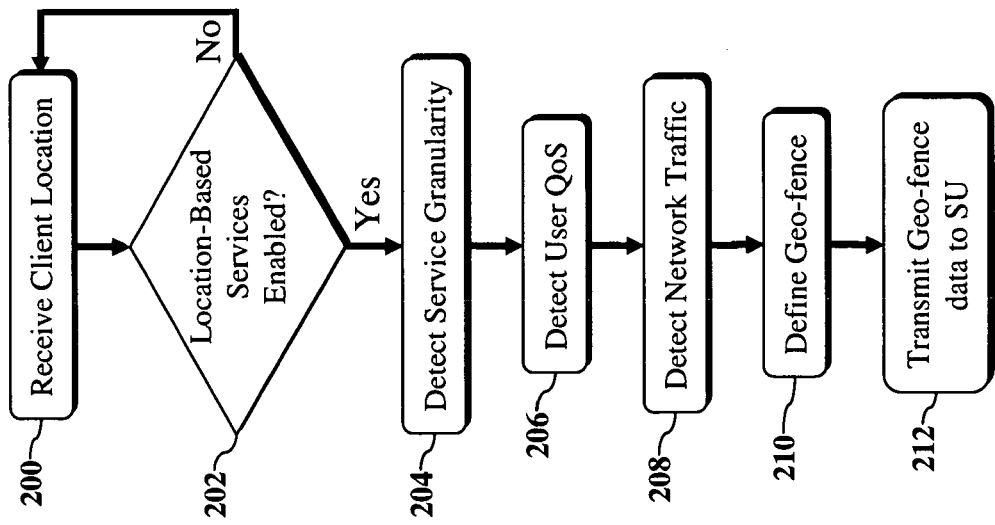
FIG. 5 is a flow diagram illustrating an embodiment of a location server.

In one embodiment, the LDT value is determined in accordance with the subscriber's associated subscription information, and the same LDT value is used to define each geo-fence associated with the subscriber. In FIG. 5, another embodiment of a location server operation is illustrated. In step 200, the location server receives a current position of the subscriber unit. In step 202, the location server determines whether any location-based or presence-based services are enabled for the subscriber unit. In step 204, the LDT requirements of the enabled services are determined. It is contemplated that different services, such as driving directions or local news, may require different LDT values. Further, in one embodiment at least one enabled service is associated with a plurality of LDT values, defining different levels of service. In step 206, the subscriber's quality of service (QoS) is determined. In one embodiment, the HLR stores subscriber information defining the service capabilities and thresholds available for the subscriber based on a QoS level associated with the subscriber's account. In step 208, the wireless network state is checked to determine whether network resources need to be preserved, in which case subscribers with lower quality of service requirements will be given larger LDT values. In step 210, a geo-fence is defined. For each enabled service, a geo-fence is defined based on LDT levels associated with the service and the subscriber's service level. Where multiple services are enabled, the geo-fence may be defined using the smallest LDT. In step 212, the geo-fence data is transmitted to the subscriber unit.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A method performed by a subscriber unit for providing location updates to a wireless network comprising:
 determining a current location of the subscriber unit;
 comparing the current location to a second location;
 receiving a location delta threshold from the wireless network, wherein the location delta threshold is selected from a plurality of geographic distances based on fee-based subscription information associated with the subscriber unit; and
 transmitting a location update, including presence information, to the wireless network when the current location differs from the second location by at least the location delta threshold.

2. The method of claim 1, wherein a size of the location delta threshold is based upon a fee paid for an account associated with the subscriber unit.

3. The method of claim 1 wherein the current location of the subscriber unit is determined using GPS.

4. The method of claim 1 wherein the current location of the subscriber unit is determined by measuring a distance between the subscriber unit and each of a plurality of base stations in the wireless network.

5. The method of claim 1 wherein the second location is a previous location of the subscriber unit.

6. The method of claim 5 wherein second location was previously transmitted to the wireless network in a location update.

7. The method of claim 1, wherein the location delta threshold is further based, at least in part, on a type of service enabled on the subscriber unit.

8. A method performed by a subscriber unit for providing location updates to a wireless network comprising:
 determining a current location of the subscriber unit;
 comparing the current location to a second location;
 receiving a location delta threshold from the wireless network, wherein the location delta threshold is based on a type of service enabled on the subscriber unit; and
 transmitting a location update, including presence information, to the wireless network when the current location differs from the second location by at least the location delta threshold,
 wherein the subscriber unit includes an associated quality of service level, and wherein the location delta threshold is further selected from a plurality of geographic distances based on the quality of service level of the subscriber unit.

9. The method of claim 8 wherein the enabled service is a presence service.

10. The method of claim 8 wherein the enabled service is a location-based service.

11. The method of claim 8 wherein the enabled service is associated with the plurality of geographic distances, each geographic distance having an associated quality of service level for the service.

12. A wireless device comprising:
 a control processor; and
 a program memory storing program instructions for causing the control processor to:
  receive a location delta threshold from a wireless network, wherein the location delta threshold in accordance is selected from a plurality of geographic distances based on fee-based subscription information associated with the wireless device;
  determine a current location of the subscriber unit;
  compare the current location to a second location; and
  transmit a location update, including presence information, to the wireless network when the current location differs from the second location by at least the location delta threshold determined, wherein the program memory includes a location delta threshold function, a subscriber unit positioning function and a client application.

13. The wireless device of claim 12 further comprising a data memory storing the second location and the location delta threshold, the data memory being configurable by the wireless network.

14. The wireless device of claim 12 wherein the second location is a previous location of the wireless device.

15. The wireless device of claim 12 wherein the client application is a client presence application, and wherein a value of the location delta threshold depends on whether the client presence application is enabled.

16. The wireless device of claim 12, wherein the location delta threshold is further based, at least in part, on a type of service enabled on the subscriber unit.

17. A wireless device comprising:
   a control processor; and
   a program memory storing program instructions for causing the control processor to perform steps including:
      receive a location delta threshold from a wireless network, wherein the location delta threshold depends on a type of service enabled on the wireless device;
      determining a current location of the subscriber unit;
      comparing the current location to a second location; and
      transmitting a location update, including presence information, to the wireless network when the current location differs from the second location by at least the location delta threshold,
   wherein the program memory includes a location delta threshold function, a subscriber unit positioning function and a client application, and
   wherein the wireless device includes an associated quality of service level, and wherein the location delta threshold is further selected from a plurality of geographic distances based on the quality of service level of the wireless device.

18. The wireless device of claim 17 further comprising a data memory storing the second location and the location delta threshold, the data memory being configurable by the wireless network.

19. The wireless device of claim 17 wherein the second location is a previous location of the wireless device.

20. The wireless device of claim 17 wherein the client application is a client presence application, and wherein a value of the location delta threshold depends on whether the client presence application is enabled.

* * * * *